United States Patent [19]

Tsutsui et al.

[11] Patent Number: 5,396,530
[45] Date of Patent: Mar. 7, 1995

[54] ENERGY DIFFERENCE IMAGE PROCESSING METHOD

[75] Inventors: Hiroshi Tsutsui, Yawata; Koichi Ohmori, Toyonaka; Tetsuro Ohtsuchi, Osaka; Sueki Baba, Suita; Masanori Watanabe, Katano, all of Japan

[73] Assignee: Matsushita Electric Industrial Co., Ltd., Osaka, Japan

[21] Appl. No.: 136,409

[22] Filed: Oct. 15, 1993

Related U.S. Application Data

[63] Continuation of Ser. No. 803,732, Dec. 9, 1991, abandoned, which is a continuation-in-part of Ser. No. 456,370, Dec. 26, 1989, abandoned.

[51] Int. Cl.$^6$ .............................................. H05G 1/64
[52] U.S. Cl. ................................. 378/98.11; 378/98.9
[58] Field of Search ................. 378/99, 98.11, 98.12; 358/111

[56] References Cited

U.S. PATENT DOCUMENTS

| | | | |
|---|---|---|---|
| 4,029,963 | 6/1977 | Alvarez | 378/5 |
| 4,506,327 | 3/1985 | Tam . | |
| 4,792,900 | 12/1988 | Sones et al. | 378/99 |

FOREIGN PATENT DOCUMENTS 62-211549  9/1987  Japan .

OTHER PUBLICATIONS

Japanese Journal of Medical Electronics and Biological Engineering, vol. 22, No. 1, pp. 53–60.
W. A. Kalender et al, An Algorithm for Noise Suppression in Dual Energy CT Material Density Images, I.E.E.E. Transactions on Medical Imaging, vol. 7, No. 3, pp. 218–224, Sep. 1988.

*Primary Examiner*—Craig E. Church
*Attorney, Agent, or Firm*—Stevens, Davis, Miller & Mosher

[57] ABSTRACT

An energy difference picture processing method comprises the steps of using a semiconductor radiation detector; providing two discriminating levels; dividing X-rays, which have passed through objects, into two kind energy zones; counting X-ray photons to obtain an X-ray picture; assembling, with corresponding coefficients, $S(H)$, $S(L)$, $\{S(H)\}^x$ and $\{S(L)\}^y$, which are exponential functions of the $S(H)$ and $S(L)$, respectively, where $S(H)$ is a logarithmically converted version of a picture of counts in a higher energy band and $S(L)$ is a logarithmically converted version of a picture of counts in a lower energy band; and performing addition, subtraction, multiplication and/or division on these terms to provide a picture in which a particular one of the materials constituting the objects is selectively extracted or removed.

2 Claims, 8 Drawing Sheets

ENERGY DIFFERENCE IMAGE PROCESSING METHOD

This application is a continuation of application Ser. No. 07/803,732, filed Dec. 9, 1991, (abandoned) which is a continuation-in-part of application Ser. No. 07/456,370, filed, Dec. 26, 1989 (abandoned).

BACKGROUND OF THE INVENTION

The present invention relates to a method of processing an image in an X-ray diagnosing device used in medical treatment or in non-destructive examination of objects used in industries industrial applications.

FIG. 6 illustrates attenuation of X-rays resulting from the X-rays being transmitted through objects. The intensities of the X-rays $I_1(E)$ transmitted through objects (1)1 and (2)2 having a thickness of $d_1$ and $d_2$, respectively, are given by $$I_1(E) = I\phi(E) \exp\{-\mu_A(E)d_1 - \mu_B(E)d_2\} \quad (1)$$

where $I_0(E)$ is the intensity of the X-rays output from an X-ray tube 3, and $\mu_A(E)$ and $\mu_B(E)$ are the attenuation coefficients of the objects (1)1, (2)2, respectively.

If the energy E of the X-rays is divided into two zones Low and High, and both sides of each of those zones, are converted logarithmically the following is obtained:

$$-\ln I'(\text{Low}) = \mu_A(\text{Low})d_1 + \mu_B(\text{Low})d_2 \quad (2)$$

$$-\ln I'(\text{High}) = \mu_A(\text{High})d_1 + \mu_B(\text{High})d_2 \quad (3)$$

$$I'(\text{Low}) = I(\text{Low})/I\phi(\text{Low})$$

$$I'(\text{High}) = I(\text{High})/I\phi(\text{High})$$

Rewriting equation (2) and (3), using $-\ln I'(\text{Low}) = S(\text{Low})$ and $-\ln I'(\text{High}) = S(\text{High})$, obtained $$S(\text{Low}) = \mu_A(\text{Low})d_1 + \mu_B(\text{Low})d_2 \quad (4)$$

$$S(\text{High}) = \mu_A(\text{High})d_1 + \mu_B(\text{High})d_2 \quad (5)$$

Solving equations (4) and (5) with respect to $d_1$ and $d_2$, obtained $$d_1 = 1/\Delta x \{\mu_B(\text{High})S(\text{Low}) - \mu_B(\text{Low})S(\text{High})\} \quad (6)$$

$$d_2 = 1/\Delta x \{-\mu_A(\text{High})S(\text{Low}) + \mu_A(\text{Low})S(\text{High})\} \quad (7)$$

The attenuation coefficients are values inherent to the materials of the objects. Thus if equations (6) and (7) are rewritten as functions of S(Low) and S(High) using coefficients $a_1$-$a_4$, then the following is obtained $$d_1 = a_1 S(\text{Low}) + a_2 S(\text{High}) \quad (8)$$

$$d_2 = a_3 S(\text{Low}) + a_4 S(\text{High}) \quad (9)$$

Equations (8) and (9) will be described using an X-ray transmission picture. Only picture components corresponding to the thickness of a specific object can be extracted from the X-ray transmission picture as a linear function of a logarithmic conversion version of the X-ray transmission picture. This method is illustrated in the following reference as energy subtraction method (differential method):

Ishida, "Hardware and Software for Picture Processing", Japanese Journal of Medical Electronics and Biological Engineering Vol. 22, No. 1, P. 53.

The above method will now be described in a practical field. As an example, assume that the objects (1) and (2) are aluminum and water, respectively. FIG. 7 illustrates the linear attenuation coefficients $\mu$ of aluminum and water. As will be seen in FIG. 7, the respective coefficients are non-linear as a function of the X-ray energy, and rapidly increase toward the lower-energy side, which increase influences the X-ray spectrum, as shown in FIG. 8. In FIG. 8, the axis of ordinates indicates the X-ray photons, the curve (1) indicates the X-ray spectrum emitted from a regular source of X-rays at a tube voltage of 120 $KV_p$ and the curves (2) and (3) indicate changes in the X-ray spectra transmitted through objects when the thickness of the object increases. As will be understood in FIG. 8, as the thickness of the object increases, the object absorbs more of the lower energy X-rays and the average energy of the transmitted X-ray spectrum shifts toward the higher energy side, which is referred to as beam-hardening.

Energy subtraction, illustrated in equations (8) and (9) in a field where such beam hardening occurs, will be applied in actual irradiation. FIG. 9 shows the shape of objects (1) and (2) used in experiments where the objects (1) and (2) are an aluminum strip 0.5 cm thick and a water body 20 cm high and shows the direction of X-ray irradiation incident on the objects. Such objects were irradiated with X-rays at an X-ray tube voltage of 120 $KV_p$ and a semiconductor radiation detector was used to scan the objects to thereby obtain transmitted pictures. The signals from the detector are separated with discriminating levels at 20 and 60 KeV. The logarithmic converted values of picture signals in 20–60 KeV and in 60–120 KeV are represented by S(Low) and S(High), respectively. The value of coefficient a was determined such that a picture of aluminum alone, namely, a picture where a water picture is erased, is obtained. The values of $a_1$ and $a_2$ used to obtain the aluminum $d_1$ picture using equation (8) are as follows:
$a_1 = 1$
$a_2 = -1.13$ FIG. 10 shows the remainder of the water signal component contained in the waterless picture and an aluminum picture signal component with the thickness of water, obtained in that case. If water is erased at a water thickness of 10 cm, the water signal component is null at that water thickness. The thickness of water increases or otherwise decreases, the remaining water signal component will be contained in the resulting picture. This is noticeable especially when the water is thin. The aluminum component has a uniform contrast difference obtained as the difference between the aluminum component and remaining water components all over the cross-section region of water. This is illustrated as an actual picture in FIG. 11 in which a water picture disappeared completely from the image screen in the vicinity of a water thickness of 10 cm and the aluminum picture alone is extracted. In a region where the water thickness is smaller or otherwise larger, the remaining water picture component appears.

As described above, the energy subtraction method cannot make an ideal subtraction over the entire cross-section regions of the objects if the thickness of the objects changes using the difference of lograithmic conversion pictures alone, as in the converting techniques.

SUMMARY OF THE INVENTION

According to the present invention, there is provided an energy difference picture processing method comprising the steps of:
using a semiconductor radiation detector;
providing two discriminating levels;
dividing X-rays, which have passed through objects, into two kind energy band;
counting X-ray photons to obtain an x-ray picture;
assembling, with corresponding coefficients, S(H), S(L), $\{S(H)\}^x$ and $\{S(L)\}^y$, which are exponential functions of the S(H) and S(L), respectively, where S(H) is a logarithmically converted version of a picture of counts in a higher energy band and S(L) is a logarithmically converted version of a picture of counts in a lower energy band; and
performing addition, subtraction, multiplication and/or division on these terms to provide a picture in which a particular one of the materials constituting the objects is selectively extracted or removed.

Thus, by providing a higher-order term, the remaining picture due to the beam hardening of the X-rays is eliminated to thereby provide an optimal energy subtraction picture from the X-ray transmission picture of an object having a changing thickness.

Also according to the invention, an energy subtraction picture processing method is provided, wherein the object through which the X-rays pass constitutes a human body and the method further comprises the steps of selectively erasing a picture of a soft tissue constituting the human body to obtain a picture solely of a bone tissue and quantitatively measuring a total weight of the bone tissue and a weight per each unit area based on a contrast in picture data.

DESCRIPTION OF THE PREFERRED EMBODIMENTS

Figure 1:
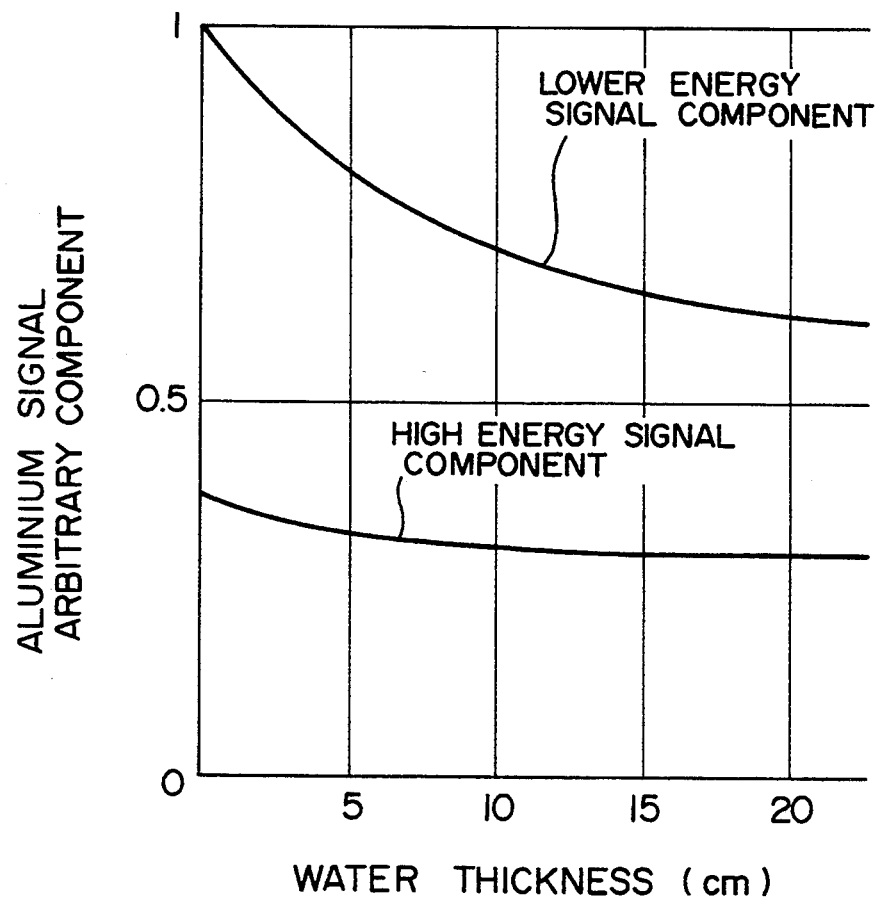
FIG. 1 illustrates higher and lower energy signal components contained in a logarithmic conversion picture.
Figure 9:
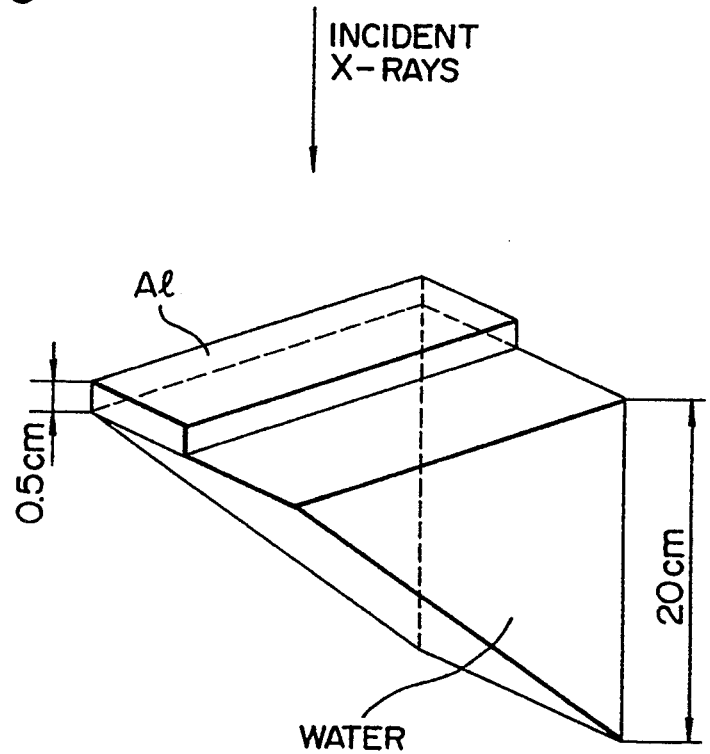
FIG. 9 illustrates models of water and aluminum used in experiment.
Figure 10:
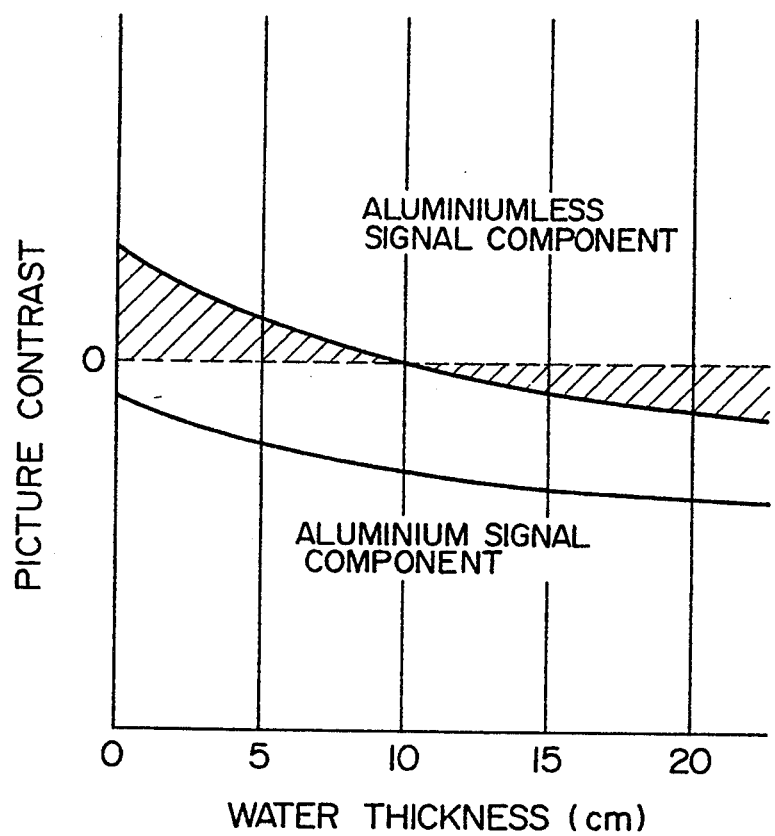
FIG. 10 illustrates the aluminum signal component obtained by conventional picture processing techniques.
Figure 11:
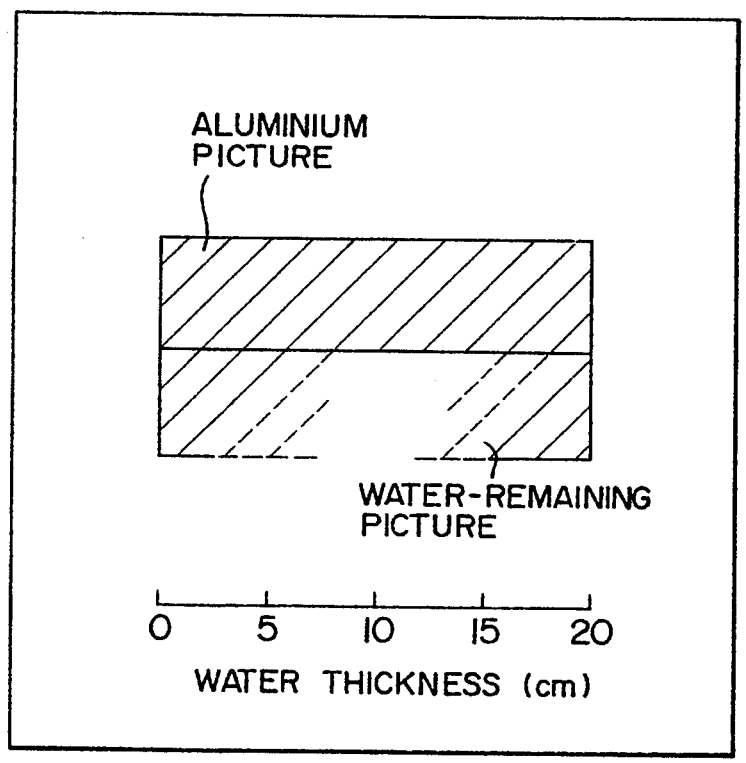
FIG. 11 illustrates the aluminum picture obtained by the conventional picture processing techniques.

FIG. 1 illustrates the results of examination of changes in the signal components due to beam hardening using the objects of FIG. 9. FIG. 1 illustrates a change in the aluminum signal component with a change in the thickness of water. A lower energy signal component is the signal component of a picture comprising an aluminumless transmission picture minus an aluminum transmission picture in the picture S(Low). A higher energy signal component is a picture signal component obtained similarly using a picture S(High). As described above, the signal component changes nonlinearly depending on the thickness of water, so that it will be seen that an optimum picture cannot be obtained by using linear expressions (8) and (9).

In order to obtain a signal component changing linearly with a change in the thickness of water from a non-linear signal component shown in FIG. 1, terms $\{S(H)\}^x$ and $\{S(L)\}^y$ are added to the equations (8) and (9) as follows:

$$d_1 = a_1 S(L) + a_2 S(H) + a_5\{S(L)\}^y + a_6\{S(H)\}^x \quad (10)$$

$$d_2 = a_3 S(L) + a_4 S(H) + a_7\{S(L)\}^y + a_8\{S(H)\}^x \quad (11)$$

In an experiment, the values of x and $a_1$–$a_8$ satisfying the optimal conditions of the above equations for incident X-rays at a tube voltage of 120 $KV_p$ are calculated.

Figure 2:
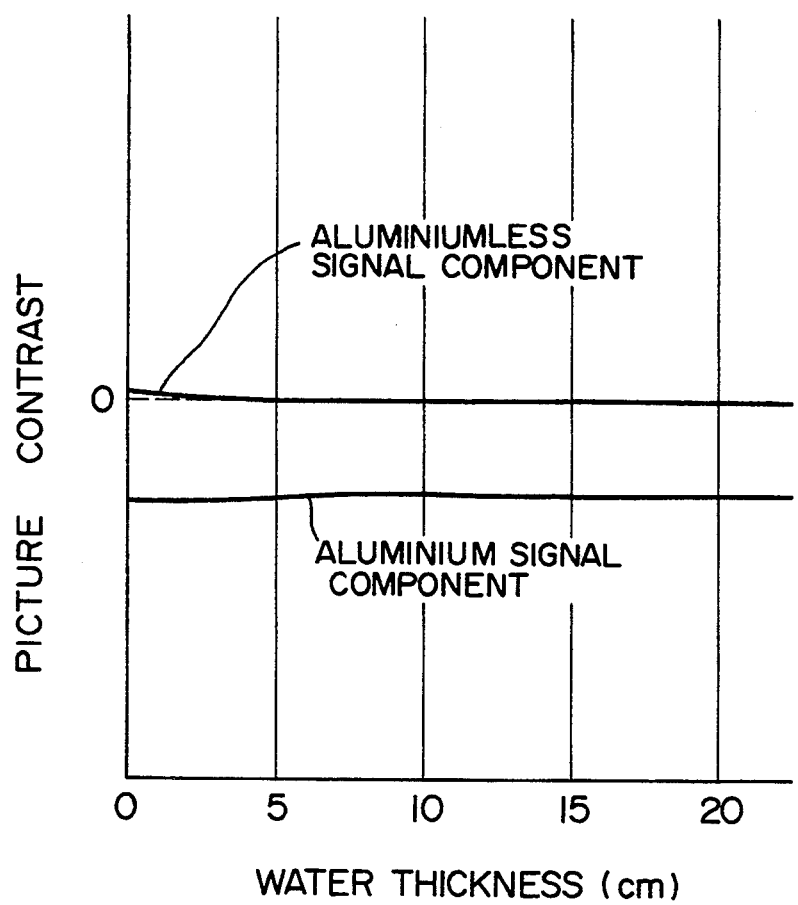
FIG. 2 illustrates an aluminum signal component obtained by the picture processing according to the present invention.
Figure 8:
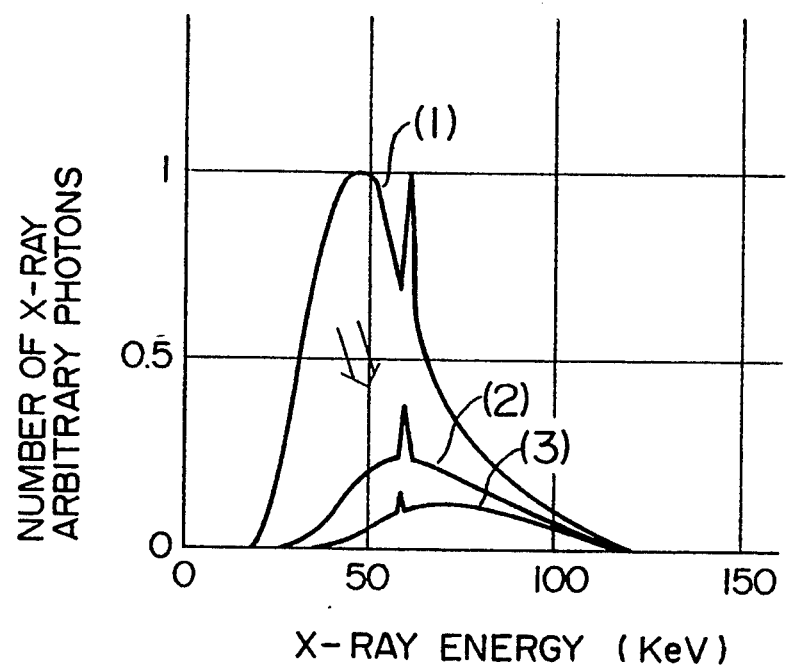
FIG. 8 illustrates the spectrum of an X-ray.

The values of $a_1$, $a_2$, $a_5$, $a_6$, x and y used to obtain the aluminum $d_1$ picture using equation (10) were as follows which were determined such that only the aluminum picture was obtained similarly at a water thickness of 10 cm also in this case:
$a_1 = -1$
$a_2 = 1.5$
$a_5 = 0.2$
$a_6 = 0.05$
$x = 1.9$
$y = 1.9$ FIG. 2 illustrates the contrast of the aluminum picture obtained using the above parameters. Compared to FIG. 8, the aluminumless signal component has a uniform contrast over a water thickness of 0–20 cm.

Similarly, the values of $a_3$, $a_4$, $a_7$, $a_8$, x and y used to obtain the water $d_2$ picture using equation (1) are as follows:
$a_3 = 1$,
$a_4 = -1.05$,
$a_7 = -0.15$,
$a_9 = 0.05$,
$x = 1.9$,
$y = 1.9$.

If processing is performed using these parameters, only a water picture substantially free from aluminum is obtained. If $a_9 \cdot S(H) \cdot S(L)$ and $a_{10} \cdot S(H) \cdot S(L)$ are added to equations (10) and (11), respectively, finer correction is possible.

The above data was obtained by measurement using cadmium tellurides and an X-ray slit to eliminate scattered X-rays to as great an extent as possible.

While the above refers to the separation of water and aluminum, the inventive concept may be applicable to objects which differ in X-ray absorption coefficient. For example, if the object is a living body, the concept may be applicable to the separation of a bone, a soft tissue, a projected blood vessel or a calcified tissue. The concept is applicable to the separation of metal and a resin.

Next, a second embodiment will be described in which a value of the higher-order term is varied to a larger extent. In this embodiment, an experiment is conducted to perform a bone densitometry quantitatively, and the results of the experiment are described.

Recently, with an increase in the number of aged persons demographically, occurrences of osteoporosis have increased. Osteoporosis is a disease in which the bones become fragile, and there is a danger of suffering bone fractures with resultant disabling conditions leaving the victim bedridden. In order to prevent such bone fractures, it is important to detect the osteoporosis at an early stage and to perform preventative medical treatments. Bone densitometry is performed to measure the content of human bones precisely and quantitatively, and it is required that there is no variation in measurement values with respect to a change in thickness of the human body. When the present invention is employed for this purpose, a maximum effectiveness can be achieved.

Figure 3:
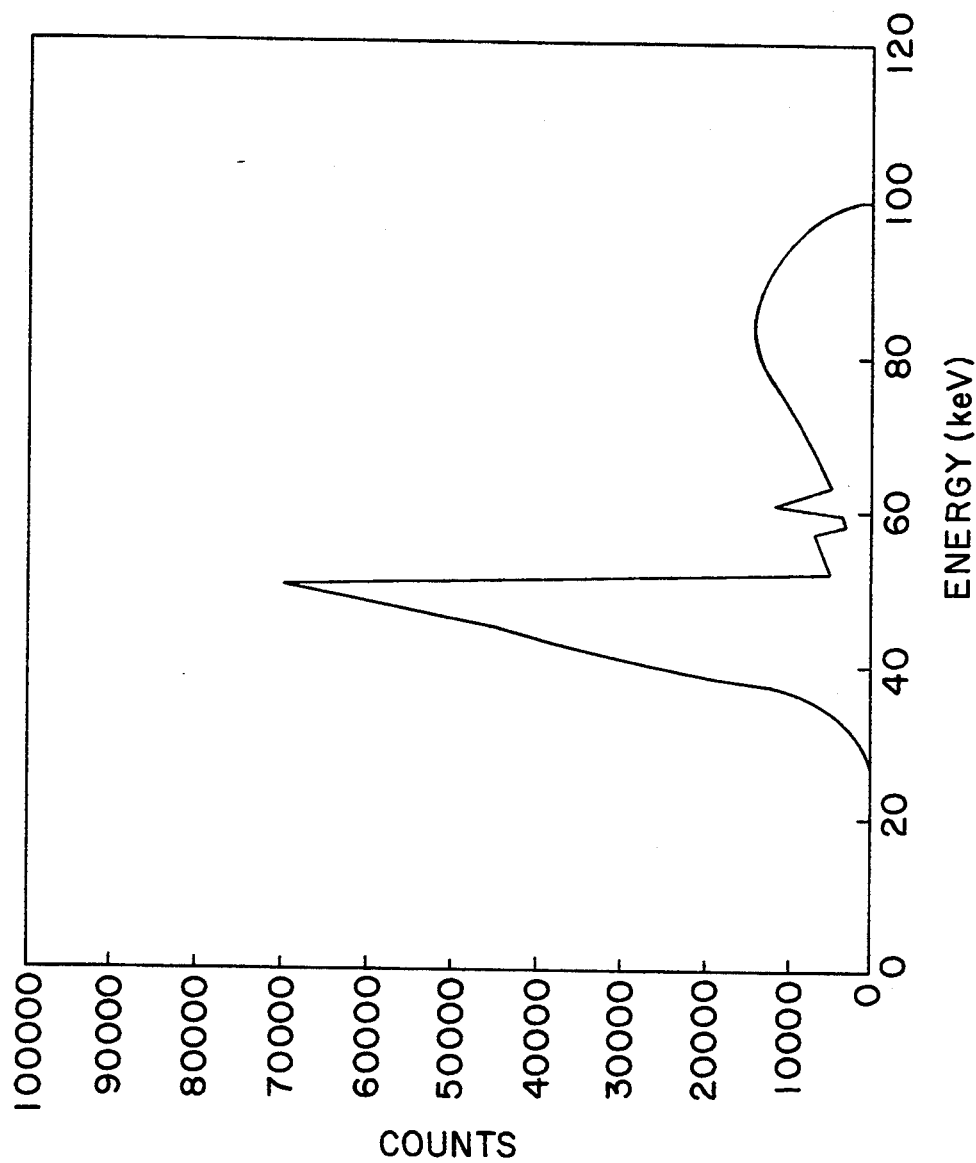
FIG. 3 illustrates an X-ray energy spectrum when a K-edge filter is used.

An experimental system used in this treatment is as follows. An X-ray source applies an application voltage of 100 kV to an X-ray tube of a constant voltage of 3 mV to generate an X-ray beam, and the X-ray energy spectrum is divided into two energy bands beforehand by using materials (Gd: 300 μm, Er: 100 μm) having an energy absorbing end at about 50 KeV denominated a K-edge filter. The object is irradiated by the divided X-ray energy bands. The X-ray energy spectrum when the K-edge filter is used is shown in FIG. 3. X-ray photons transmitted through the object are separated into two energy bands by using two discriminator comparators and a pulse counting measurement is conducted by using a CdTe one-dimensional semiconductor radiation detector (hereinafter referred to as a CdTe X-ray image sensor).

A phantom used in the measurement includes a phantom (bone density of 1.0 g/cm$^3$) which is equivalent to a bone and buried in a part of an acrylic phantom having a thickness changing stepwise in a range of 15–30 cm.

An X-ray is irradiated onto this phantom, and the X-ray tube and the X-ray image sensor are fixed, and the measurement of the X-ray is conducted by moving the object relative to the X-ray tube and sensor. A distance between the X-ray source and the detector is 1 m. The result of counting of two high and low X-ray energy intensities by the above-mentioned detector is shown in Table 1. Furthermore, values after logarithmic conversion are shown in Table 2.

TABLE 1

| Thickness of Phantom (cm) | Transmission Count Number of Bone + Acryl | | Transmission Count Number of Bone alone | |
|---|---|---|---|---|
| | S (L) | S (H) | S (L) | S (H) |
| 0 | 477,604 | 230,883 | 477,604 | 230,883 |
| 15 | 4,933 | 8,744 | 11,168 | 13,158 |
| 20 | 1,414 | 3,308 | 3,157 | 4,697 |
| 25 | 407 | 1,203 | 893 | 1,689 |
| 30 | 107 | 412 | 258 | 595 |

TABLE 2

| Thickness of Phantom (cm) | Bone + Acryl −ln(I/I$_0$) | | Acryl alone −ln(I/I$_0$) | |
|---|---|---|---|---|
| | S (L) | S (H) | S (L) | S (H) |
| 15 | 4.5728 | 3.2735 | 3.7557 | 2.8649 |
| 20 | 5.8252 | 4.2456 | 5.0192 | 3.8950 |
| 25 | 7.0677 | 5.2570 | 6.2820 | 4.9178 |

TABLE 2-continued

| Thickness of Phantom (cm) | Bone + Acryl −ln(I/I$_0$) | | Acryl alone −ln(I/I$_0$) | |
|---|---|---|---|---|
| | S (L) | S (H) | S (L) | S (H) |
| 30 | 8.0437 | 6.3286 | 7.5236 | 5.9611 |

The results of subtraction by using the values of Table 1 and Table 2 are shown in Table 3 to Table 7. Furthermore, these results are summarized and shown in FIG. 4, wherein the letter K is the conversion coefficient for converting a calculated value into a density, and the coefficient is obtained so that a measurement value for a thickness of 15 cm becomes "1".

TABLE 3

Results of Subtraction (1)
The correction by a higher-order term is not included.

| Thickness of Phantom (cm) | No Correction | | |
|---|---|---|---|
| | Bone Portion | Acryl Portion | Formula: |
| 15 | 1.000 | 0.000 | K(S(L)-AxS(H) |
| 20 | 0.773 | −0.239 | |
| 25 | 0.566 | −0.435 | |
| 30 | 0.544 | −0.603 | |

TABLE 4

Results of Subtraction (2)
The correction by a higher-order term is included.

| Thickness of Phantom (cm) | No Correction | | |
|---|---|---|---|
| | Bone Portion | Acryl Portion | |
| 15 | 1.000 | 0.0008 | K(S(L)-AxS(H)-BxS(L)$^2$) |
| 20 | 1.1995 | −0.06687 | |
| 25 | 1.3068 | −0.00197 | |
| 30 | 1.5988 | 0.00838 | |

TABLE 5

Results of Subtraction (3)
The correction by a higher-order term is included.

| Thickness of Phantom (cm) | Higher-Order Term Correction Included (L$^{-1}$) | | |
|---|---|---|---|
| | Bone Portion | Acryl Portion | |
| 15 | 1.000 | −0.0110 | K(S(L)-AxS(H)-BxS(L)$^{-1}$) |
| 20 | 1.1650 | 0.00822 | |
| 25 | 1.1193 | −0.0183 | |
| 30 | 1.2920 | 0.01580 | |

TABLE 6

Results of Subtraction (4)
The correction by a higher-order term is included.

| Thickness of Phantom (cm) | Higher-Order Term Correction Included (L$^{-2}$) | | |
|---|---|---|---|
| | Bone Portion | Acryl Portion | |
| 15 | 1.000 | −0.00158 | K(S(L)-AxS(H)-BxS(L)$^{-2}$) |
| 20 | 1.1496 | 0.00322 | |
| 25 | 1.0785 | 0.00265 | |
| 30 | 1.0372 | −0.1997 | |

TABLE 7

Results of Subtraction (5)
The correction by a higher-order term is included.

| Thickness of Phantom (cm) | Higher-order Term Correction Included (L$^{-3}$) | | |
|---|---|---|---|
| | Bone Portion | Acryl Portion | |
| 15 | 1.000 | 0.000094 | K(S(L)-AxS(H)-BxS(L)$^{-3}$) |
| 20 | 1.1349 | 0.0476 | |

TABLE 7-continued

Results of Subtraction (5)
The correction by a higher-order term is included.

| Thickness of Phantom (cm) | Higher-order Term Correction Included ($L^{-3}$) | |
|---|---|---|
| | Bone Portion | Acryl Portion |
| 25 | 1.0436 | 0.00046 |
| 30 | 0.9827 | −0.2199 |

Figure 4:
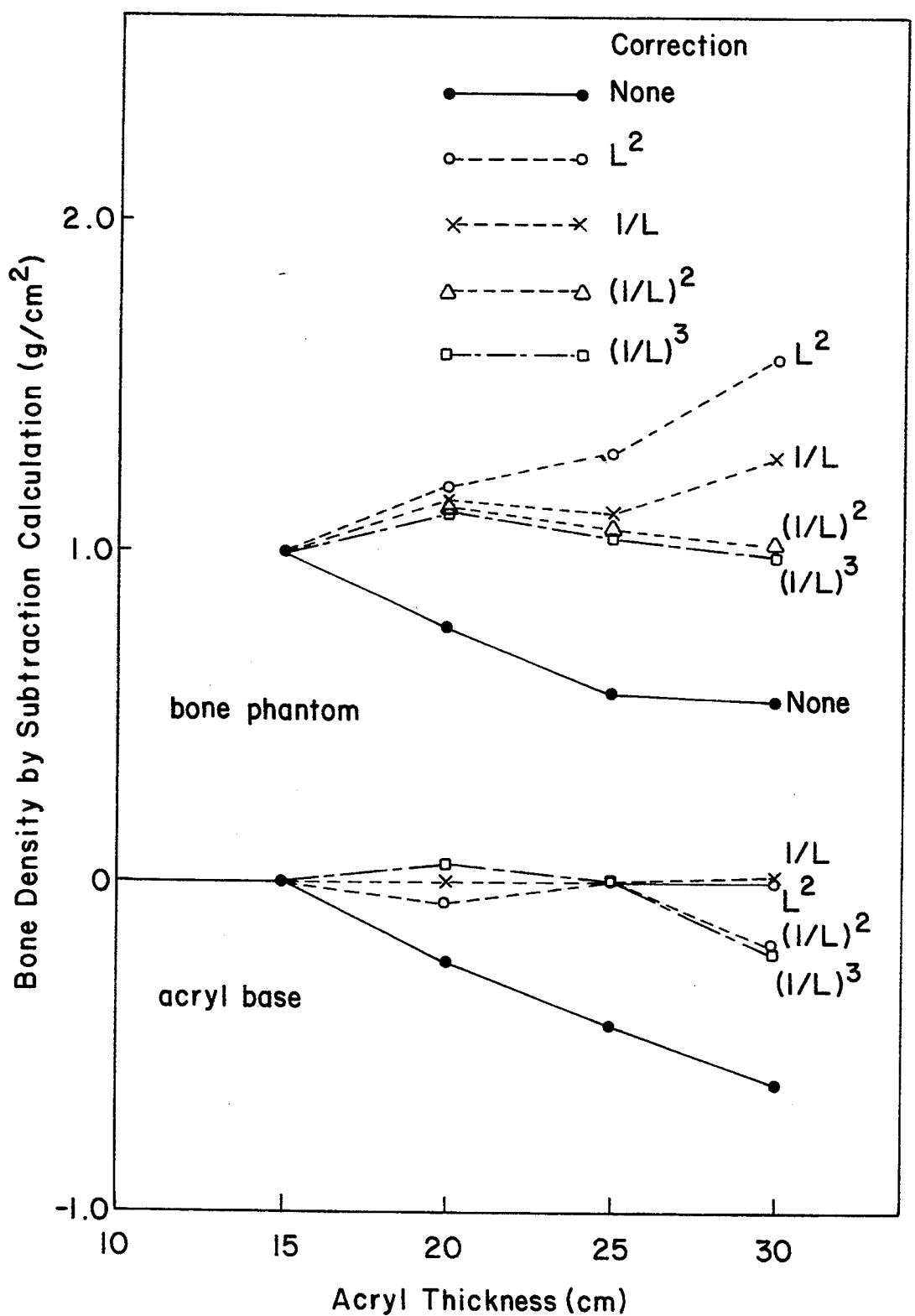
FIG. 4 is a graph of a bone density with respect to an acrylthickness.
Figure 5:
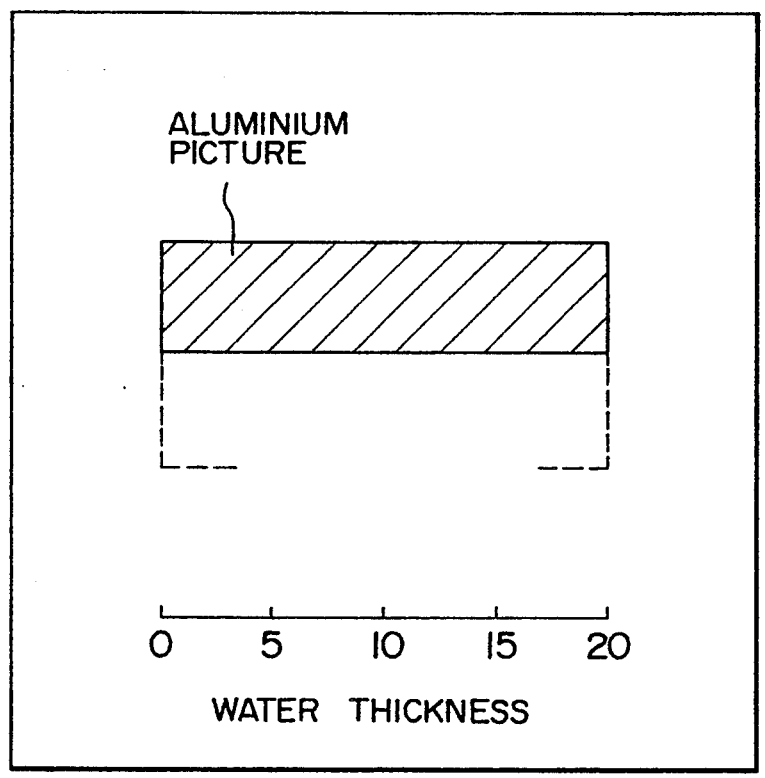
FIG. 5 illustrates an aluminum picture obtained by picture processing according to the present invention.
Figure 6:
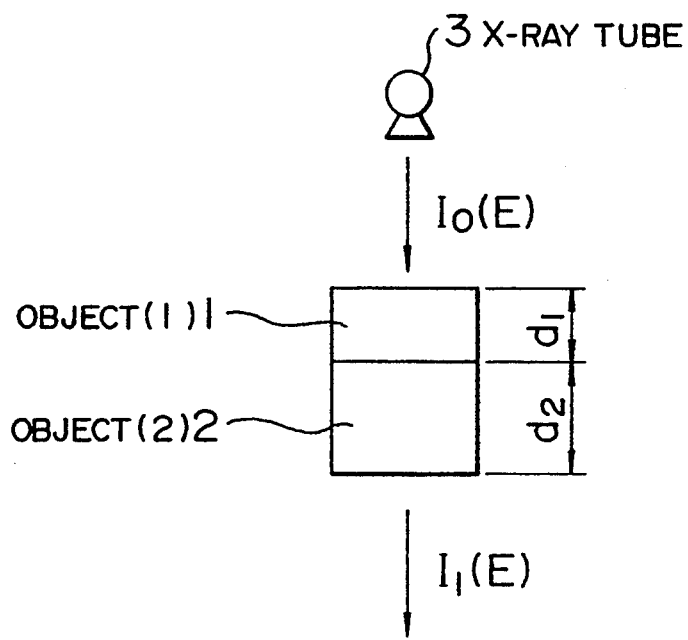
FIG. 6 illustrates a model of objects through which X-rays have passed.
Figure 7:
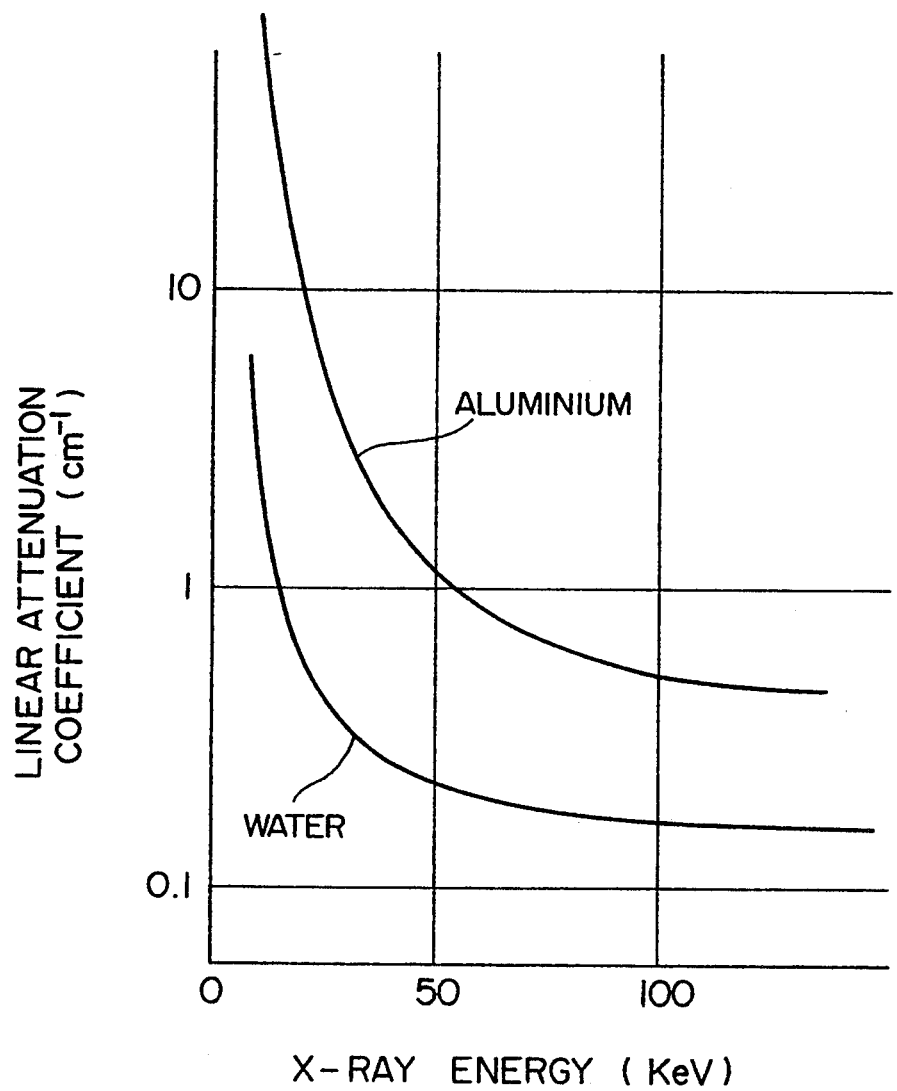
FIG. 7 illustrates the linear attenuation coefficients of water and aluminum.

From the results shown in FIG. 4, the following points will be understood:

1) In the case where a value after the subtraction does not use a correction term (or terms) of higher-order, both a value of an acryl base and a value of a bone phantom are decreased with an increase in thickness of an acryl due to X-ray beam hardening.

2) In the case where the higher-order terms are used, the acryl base which is closest to zero over the whole thickness is $S(L)^{-1}$, followed by $S(L)^2$. $S(L)^{-2}$ and $S(L)^{-3}$ somewhat drop at a point of 30 cm.

3) In the case where the higher-order terms are used, the bone phantom which is closest to "1" over the whole thickness is in the cases of $S(L)^{-2}$ and $S(L)^{-3}$, followed by $S(L)^{-1}$. $S(L)^2$ increases to a great extent as the acryl thickness increases.

4) When the results are judged comprehensively from the standpoint of measurement of a value of the bone phantom, changes in $S(L)^{-2}$ and $S(L)^{-3}$ as higher-order correction terms are smallest. The next smallest change is in $S(L)^{-1}$, and in the case of $S(L)^2$, a change is largest.

When considering the experimental results described above, it has been proved that the correction of the energy subtraction is not uniform depending on the conditions including the distribution of the X-ray spectrum in the experimental system, the manner of occurrence of a beam hardening phenomenon, and the energy resolution with respect to the X-ray in the X-ray detector. In the case of the second embodiment, in connection with the erasure of the acryl base, it is satisfactorily erased over the whole thickness by the correction using the term of $S(L)^2$. However, in connection with the bone portion, when the correction is performed by using $S(L)^2$, the $S(L)^2$ is increased with an increase in thickness of the acryl. In contrast, the correction using $S(L)^{-1}$, $S(L)^{-2}$ and $S(L)^3$ enables a more satisfactory result to be obtained than that by using $S(L)^2$. As described above, it is not always preferable to use a power of an integer in the correction method, and it is necessary to appropriately select the order of the power. In the present invention, $L^x$ and $H^y$ are used to express this, and an appropriate correction becomes possible by changing the values of x and y dynamically. Furthermore, by virtue of this correction, it is possible to quantify a measurement value, and this can be advantageously utilized in a quantitative measurement of an amount of bone chloride. Moreover, by measuring an area of a bone portion on a picture screen, it is possible to convert a unit system of $g/cm^2$, that is, an amount contained per unit area.

A semiconductor radiation sensor used for photographing should be able to measure the spectrum of silicon, germanium, gallium arsenide, cadmium tellurides or mercury iodide.

According to the present invention, a distortion of a picture contrast caused by beam hardening when the logarithmically converted versions of pictures in separated higher and lower energy regions and then separated pictures of a substance using a subtraction method are obtained is eliminated by adding, to the terms indicative of the logarithmically converted pictures, terms of higher degrees than those indicative of the logarithmically converted pictures during subtraction to thereby provide a distortionless picture.

By using the semiconductor in a spectroscopic manner, higher and lower energy pictures are obtained simultaneously by single X-ray exposure, which is an effective process for photographing a moving object.

What is claimed is:

1. An energy subtraction picture processing method comprising the steps of:
   (a) employing a semiconductor radiation detector to detect X-rays which have penetrated an object and to provide output signals representing the detected X-rays;
   (b) providing a pair of discriminating levels for dividing said output signals from said detector representing the detected X-rays into a high level energy band and a low level energy band;
   (c) obtaining logarithmically converted data S(L) of the X-ray picture formed by a counted value of x-ray photons in said low level energy band, said logarithmically converted data being defined as $S(L) = -\ln(I(L)/I_0(L))$ where $I_0(L)$ indicates incident counts of low energy X-rays and I(L) indicates one of (i) counts of low energy X-rays which have penetrated the object and (ii) low energy X-rays which have penetrated the object;
   (d) obtaining logarithmically converted data S(H) of the X-ray picture formed by a counted value of x-ray photons in said high level energy band, said logarithmically converted data being defined as $S(H) = -\ln(I(H)/I_0(H))$ where $I_0(H)$ indicates incident counts of high energy X-rays and I(H) indicates one of (i) counts of high energy X-rays which have penetrated the object and (ii) high energy X-rays which have penetrated the object;
   (e) obtaining an exponential function $\{S(L)\}^y$ of S(L), said exponential function being defined as $\{S(L)\}^y = \{-\ln(I(L)/I_0(L))\}^y$;
   (f) obtaining an exponential function of S(H), said exponential function being defined as $\{S(H)\}^x = \{-\ln(I(H)/I_0(H))\}^x$, where x and y are selected from the group comprising zero, negative numbers and non-integer positive numbers with x and y not being simultaneously selected to be zero;
   (g) multiplying S(H), S(L) and $\{S(H)\}^x$, $\{S(L)\}^y$, respectively, by predetermined constant coefficients $a_1$, $a_2$, $a_3$ and $a_4$, where $a_1$ is selected from the group of integral numbers, and $a_2$, $a_3$ and $a_4$ are selected from the group of non-integral numbers; and
   (h) performing addition of S(H), S(L), $\{S(H)\}^x$, and $\{S(L)\}^y$ multiplied by the predetermined coefficients $a_1$, $a_2$, $a_3$ and $a_4$, respectively, in step (g), so as to provide a picture from which a particular one of the materials constituting the object is selectively extracted or removed.

2. An energy subtraction picture processing method comprising the steps of:
   (a) employing a semiconductor radiation detector to detect X-rays which have penetrated an object and to provide output signals representing the detected X-rays;

(b) providing a pair of discriminating levels for dividing said output signals from said detector representing the detected X-rays into a high level energy band and a low level energy band;

(c) obtaining logarithmically converted data $S(L)$ of the X-ray picture formed by a counted value of x-ray photons in said low level energy band, said logarithmically converted data being defined as $S(L) = -\ln(I(L)/I_0(L))$ where $I_0(L)$ indicates incident counts of low energy X-rays and $I(H)$ indicates one of (i) counts of low energy X-rays which have penetrated the object and (ii) low energy X-rays which have penetrated the object;

(d) obtaining logarithmically converted data $S(H)$ of the X-ray picture formed by a counted value of x-ray photons in said high level energy band, said logarithmically converted data being defined as $S(H) = -\ln(I(H)/I_0(H))$ where $I_0(H)$ indicates incident counts of high energy X-rays and $I(H)$ indicates one of (i) counts of high energy X-rays which have penetrated the object and (ii) high energy X-rays which have penetrated the object;

(e) obtaining an exponential function $\{S(L)\}^y$ of $S(L)$, said exponential function being defined as $\{S(L)\}^y = \{-\ln(I(L)/I_0(L))\}^y$;

(f) obtaining an exponential function of $S(H)$, said exponential function being defined as $\{S(H)\}^x = \{-\ln(I(H)/I_0(H))\}^x$, where x and y are selected from the group comprising zero, negative numbers and non-integer positive numbers with x and y not being simultaneously selected to be zero;

(g) multiplying $S(H)$, $S(L)$ and $\{S(H)\}^x$, $\{S(L)\}^y$, respectively, by predetermined constant coefficients $a_1$, $a_2$, $a_3$ and $a_4$, where $a_1$ is selected from the group of integral numbers, and $a_2$, $a_3$ and $a_4$ are selected from the group of non-integral numbers; and (h) performing subtraction of $S(H) - S(L) - \{S(H)\}^x - \{S(L)\}^y$ multiplied by the predetermined coefficients $a_1$, $a_2$, $a_3$ and $a_4$, respectively, in step (g), so as to provide a picture from which a particular one of the materials constituting the object is selectively extracted or removed.

* * * * *